United States Patent [19]
Newton

[11] Patent Number: 5,264,782
[45] Date of Patent: Nov. 23, 1993

[54] DROPOUT RECOVERY CIRCUIT
[75] Inventor: Stephen F. Newton, Endicott, N.Y.
[73] Assignee: International Business Machines Corporation, Armonk, N.Y.
[21] Appl. No.: 927,903
[22] Filed: Aug. 10, 1992
[51] Int. Cl.[5] ............................................. G05F 1/575
[52] U.S. Cl. .................... 323/288; 323/222; 323/901; 363/49
[58] Field of Search ............. 323/222, 282, 284, 288, 323/351, 901; 363/49

[56] References Cited
U.S. PATENT DOCUMENTS
3,959,714  5/1976  Mihelich ........................... 323/901
4,806,842  2/1989  Bittner ............................. 323/901

OTHER PUBLICATIONS
Design of a 1kW Power Factor Correction Circuit Power Electronics Jul. 1990. pp. 17-24. Mehmet K. Nalbant and Jon Klein.

*Primary Examiner*—Jeffrey Sterrett
*Attorney, Agent, or Firm*—William H. Steinberg

[57] ABSTRACT

A regulator circuit is provided that allows recovery in a controlled manner in the shortest possible time from occasional power line disturbances such as momentary line dropouts or under voltage. The voltage used to control switching of the switch mode converter follows the decrease in the output voltage during dropout, when switching of the switchmode converter ceases. When the line returns, the voltage used to control the switching is allowed to ramp up to the desired value providing a controlled recovery.

8 Claims, 10 Drawing Sheets

DROPOUT RECOVERY CIRCUIT

CROSS-REFERENCE TO RELATED APPLICATIONS

The present application is related to co-pending applications:
1. Ser. No. 07/927,908 entitled "VOLTAGE RATIO TO CURRENT CIRCUIT"
2. Ser. No. 07/927,572 entitled "ON TIME CONTROL AND GAIN CIRCUIT"
3. Ser. No. 07/927,590 entitled "CRITICALLY CONTINUOUS BOOST CONVERTER."

all assigned to the same assignee as the present invention, and filed on the same date as the present application. The co-pending applications are hereby incorporated by reference.

BACKGROUND OF THE INVENTION

The present invention relates to off line power processing equipment and more specifically to control circuitry for dealing with momentary power line dropouts.

Modern off line power processing equipment usually contains control circuitry that senses several state variables to provide regulation and protection. Output voltage is sensed and compared to a reference to develop an error voltage used for regulation, average input voltage may be sensed to modify feedback loop gain to compensate for input voltage dependence of power train gain, and power switch current may be sensed to limit peak current in the device. Alternatively, in a circuit in which the inductor current returns to zero each cycle, volt time across the inductor may be estimated to limit the peak power switch current.

When the input voltage to the power supply disappears, the output voltage drops, causing the error voltage to rise. If input voltage gain compensation is present the feedback loop gain rises, and volt time limiting circuitry allows very long conduction intervals, since no voltage appears across the inductor. If input voltage reappears after a short interval, the control circuit may have difficulty adjusting. The high error voltage level can cause the power train to attempt to deliver a very large amount of power in a short time to raise the output voltage to the correct level. Since it may take several line cycles for the average input voltage sensing circuit to recover, loop gain may be above the designated value, so oscillation or overshoot may occur. The voltage sensing portion of the volt time limit circuit also requires time to recover, so power train components may be overstressed due to excess current or volt time.

Following a line dropout it is desirable that the output voltage return to the correct level in a controlled manner as soon as possible without overshoot and without overstressing power train components. A commonly used partial solution to the problem is direct sensing of current by use of either a current sensing transformer or resistor. However, current transformers are large and costly, and resistor sensing is dissipative and prone to noise problems.

It is an object of the present invention to provide a control circuit that allows smooth recovery from momentary power line drop outs.

SUMMARY OF THE INVENTION

In one aspect of the present invention a soft start circuit for controlling the switching of a switchmode convertor to achieve a desired output is provided. The soft start circuit includes means for providing a signal proportional to the output of the switchmode converter to be controlled. A reference signal is provided proportional to the desired output value. A ramp circuit generates a signal which ramps to the reference signal during start and restart of the switchmode convertor. The ramp circuit is started at a value proportional to the output of the switch mode regulator to be controlled. The ramp circuit signal is compared to the signal proportional to the output of the switchmode regulator to generate an error signal which is used to control the switchmode converter.

In another aspect of the present invention a switchmode converter having a switch controlling the transfer of power from the input to the output the converter is provided. The converter includes means for generating a signal proportional to the output provided by the converter and means for generating a reference signal. The means for generating a reference signal includes means for controlling the rate at which the signal increases to a predetermined maximum value. The converter further includes means for comparing the signal proportional to the output of the converter to the reference signal for generating an error signal and control means for controlling the switching of the switchmode converter to control the output voltage of the converter responsive to the error signal. Means for detecting a drop in the input voltage supplied to the switchmode converter below a predetermined value are provided and other means responsive to detection of a drop in the input voltage discontinue the switching of the switchmode converter when the input voltage is below a predetermined value. Means responsive to the means for detecting a drop in the input voltage are provided for causing the reference voltage to track the signal proportional to the output of the converter while the input voltage is below a predetermined value, so that when the input voltage is no longer below a predetermined value, the reference voltage increases at a predetermined rate and the converter resumes switching.

DETAILED DESCRIPTION OF THE INVENTION

Figure 1:
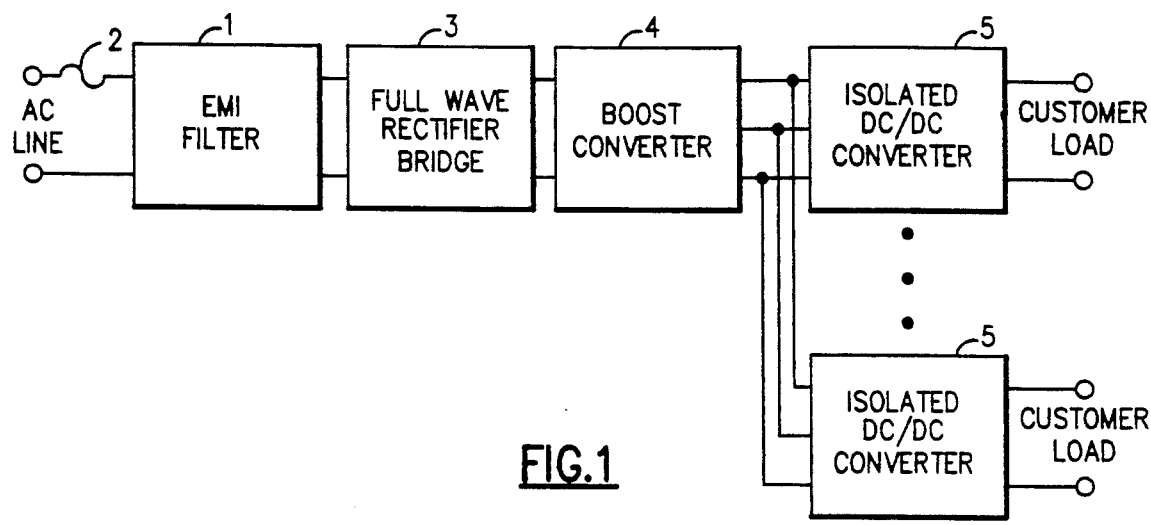
FIG. 1 is a block diagram representation of a power system for supplying DC bus voltages for distributed power use by isolated DC/DC converters while drawing near in-phase sinusoidal input current from an AC supply line.

Referring now to the drawing wherein like numerals indicate like elements throughout and particularly FIG. 1 thereof, a block diagram of a power system for supplying DC bus voltages for distributed power use by isolated DC/DC converters while drawing near in-phase sinusoidal input current from an AC supply line is shown. An electromagnetic interference (EMI) filter 1 is shown connected to an AC line protected by a fuse 2. A full wave rectifier bridge 3 receives the filtered AC line and provides a DC input to a boost (step-up) switchmode DC-DC converter 4. The DC output voltage, which is greater than the DC input voltage, is provided to one or more isolated DC/DC converters 5 which provide power to a load (not shown).

Figure 2:
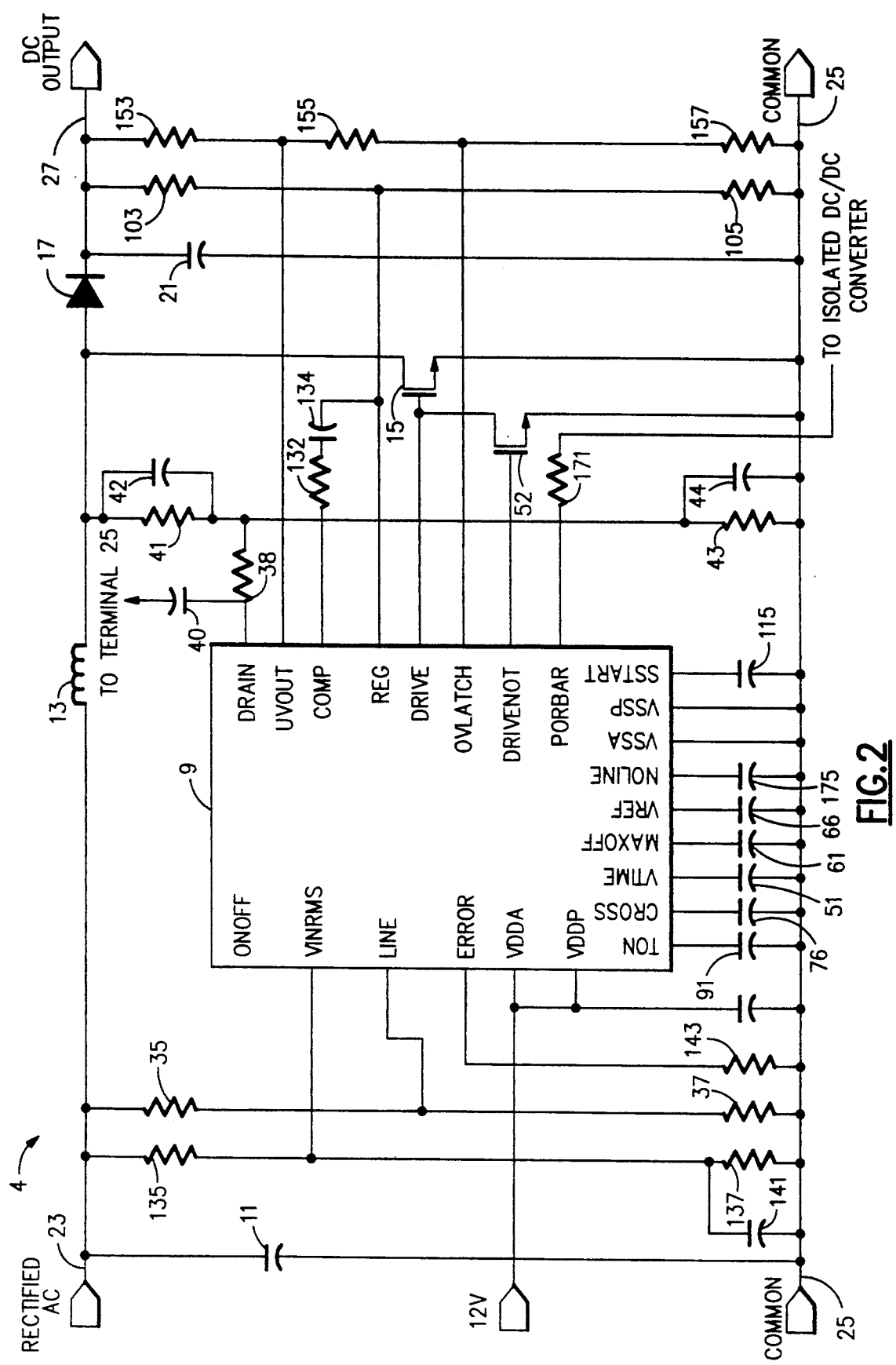
FIG. 2 is a part block diagram part schematic representation of the boost converter shown in FIG. 1.

Referring to FIG. 2, the boost converter 4, including an application specific integrated circuit (ASIC) which serves as a controller 9 for the boost converter, is shown. The boost converter 4 comprises an input filter capacitor 11, an inductor 13, a power switch 15, a diode 17, and an output filter capacitor 21. The input capacitor 11 is connected across the input terminals 23 and 25, which provide rectified and EMI filtered AC power to the converter. The capacitor 11 is selected to have a value which will filter high frequencies, much greater than 120 Hertz, generated by the boost converter and not significantly distort the rectified AC power supplied to the converter. Inductor 13 is connected in series with one end of capacitor 11, the other end of capacitor 11 is connected to the common input and output terminal 25 of the converter. The power switch comprises an NMOS transistor 15, having its source and drain connected to the other end of inductor 13 and common input output terminal 25. Diode 17 is in series with inductor 13 and diode 17 is poled to deliver energy stored in inductor 13 to a DC output terminal 27. Output filter capacitor 21 is connected between terminals 27 and 25 and serves as the bulk capacitor, providing energy storage. The output filter capacitor is sized to have a larger capacitance than input capacitance 11.

Figure 3A:
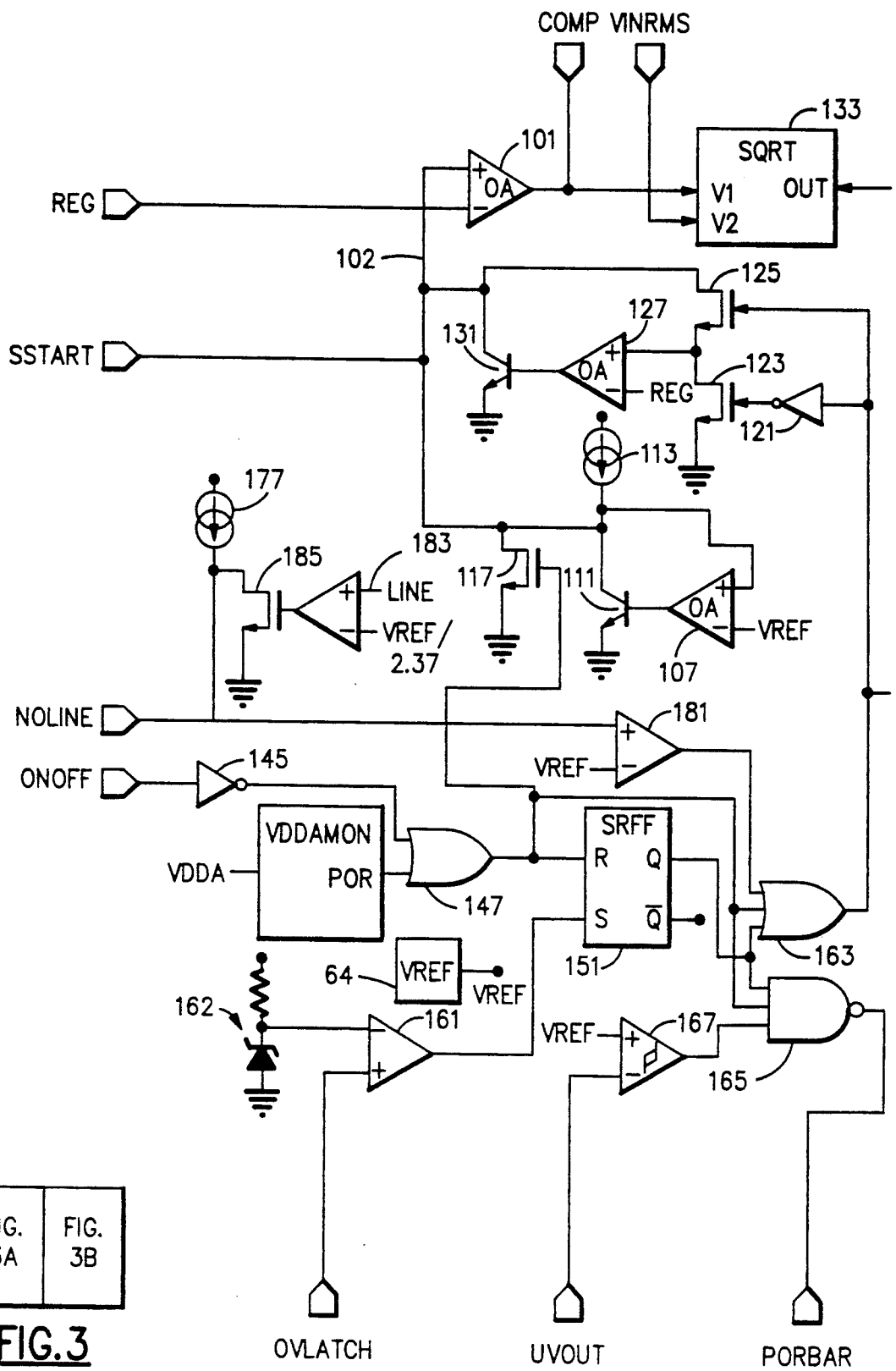
FIG. 3 is a part schematic part block diagram of the application specific integrated circuit shown in FIG. 2.
Figure 3B:
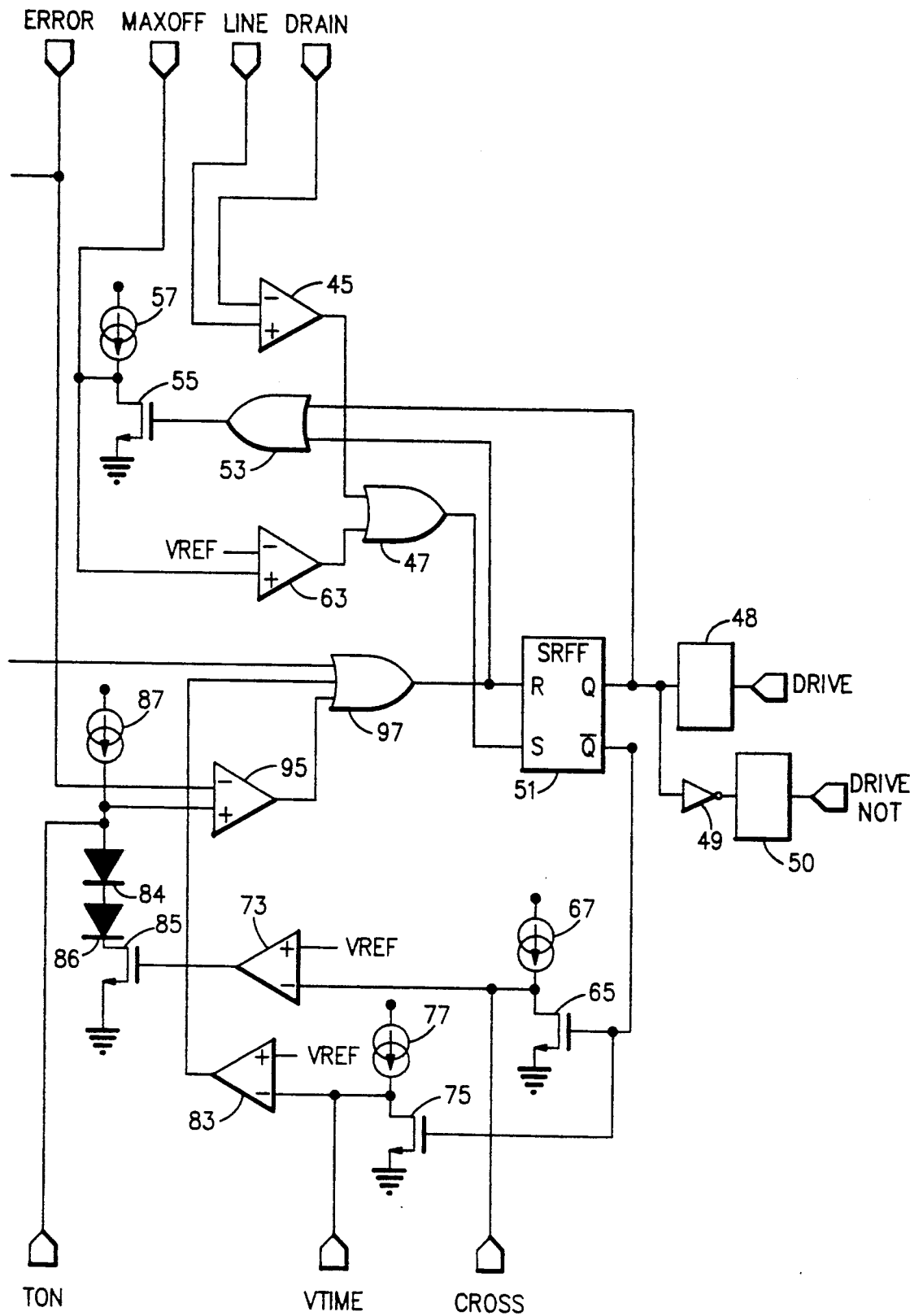

A part schematic part block diagram of the controller 9 is shown in FIG. 3. The controller provides five functions: 1) power switch turn-on; 2) power switch turn-off; 3) output voltage regulator; 4) control logic and driver; and 5) monitor and protection circuitry. Referring now to FIGS. 2 and 3, the controller 9 receives a signal labelled DRAIN which is proportional to the voltage on the drain of the power switch 15 from a voltage divider shown in FIG. 2, including two resistors 41 and 43 connected between the drain and the common terminal 25. The resistors 41 and 43 each have a respective capacitor 42 and 44 in parallel. The impedances of capacitors 42 and 44 are proportional to the resistors 41 and 43 they are in parallel with. The signal from the voltage divider passes through a delay circuit comprising resistor 38 and capacitor 40. Resistor 38 connects the voltage divider signal to the DRAIN input. Capacitor 40 is connected between the DRAIN and common terminal 25. Signals that interface between the ASIC and external circuitry are designated by names all in caps. The controller receives a signal LINE proportional to the line voltage, which is the rectified input voltage from a voltage divider comprising resistors 35 and 37 connected between terminals 25 and 27. These two signals LINE and DRAIN are connected to the noninverting and inverting terminals of a comparator 45 in the power switch turn-on circuitry. The output of comparator 45 is connected to one input of a two input OR gate 47. The output of OR gate 47 is connected to the set terminal of an RS flip flop 51. The Q output of the flip flop is connected through a driver 48 to the output of the controller labelled DRIVE which is connected to the gate of transistor 15 and through an inverting driver 49 to the output of the controller labelled DRIVENOT which is connected to transistor 52. The Q output is also connected to one input of a two input OR gate 53. The other input of OR gate 53 is connected to the reset input of RS flip flop 51. The output of OR gate 53 is connected to the gate of an NMOS transistor 55. A current source 57 is connected in series with the drain and source of transistor, with the source connected to ground. A signal labeled MAXOFF is provided by current source 57 and is connected to one end of a capacitor 61 shown in FIG. 2. The other end of capacitor 61 is connected to the common terminal 25. The signal MAXOFF is also connected to the noninverting input of a comparator 63. A voltage reference generated by the controller circuitry 64, VREF, is connected to the inverting input of comparator 63. VREF is connected to capacitor 66 which is external to the controller. The output of comparator 63 is connected to the other input of OR gate 47.

The power switch turn-off control comprises an NMOS transistor 65 having its drain connected to a current source 67. The gate of the transistor is connected to the Qbar output of the RS flip flop 51. The source of transistor 65 is connected to ground.

A signal labelled CROSS is provided by current source 67 and is connected to one end of a capacitor 71 shown in FIG. 2. The other end of capacitor 71 is connected to the common terminal 25. The signal CROSS is also connected to the inverting input of a differential amplifier 73. The noninverting input of differential amplifier 73 is connected to VREF. An NMOS transistor 75 is in series with a current source 77. The gate of the transistor is connected to the Qbar output of RS flip flop 51. The source of transistor 75 is connected to ground. A signal labelled VTIME is provided by current source 77 and is connected to one end of a capacitor 81 shown in FIG. 2. The other end of capacitor 81 is connected to the common terminal 25. The signal VTIME is also connected to the inverting input of a comparator 83. The noninverting input of the comparator is connected a voltage reference generated by the control circuit. An NMOS transistor 85 is in series with a diodes 84 and 86 and a current source 87. The drain of transistor 85 is connected to the cathode of diode 86. The anode of diode 86 is connected to the cathode of diode 84. The gate of the transistor is connected to the output of differential amplifier 73. The source of the transistor is connected to ground. A signal labelled TON is provided by current source 87 and is connected to the anode of diode 84. Signal TON is also connected to one end of a capacitor 91 shown in FIG. 2. The other end of capacitor 91 is connected to the common terminal 25. The noninverting input of comparator 95 is connected between current source 87 and transistor 85. The output of comparator 95 is connected to one input of a three input OR gate 97. The output of comparator 83 provides another input to OR gate 97. The output of OR gate 97 is connected to the reset terminal of RS flip flop 51.

The voltage regulator portion of the controller comprises linear mode amplifier 101 which has a signal labelled REG connected to the inverting input of amplifier 101. The signal REG, provided by a voltage divider comprising resistors 103 and 105, is proportional to the output voltage of the converter. Resistors 103 and 105 are connected in series between terminals 27 and 25. An operational amplifier 107 has a voltage VREF generated by controller circuitry in block 64, connected to its inverting input terminal. The output of operational amplifier 107 is connected to the base of an npn transistor 111. The collector and emitter are connected in series with a current source 113. The output of the current source is connected to the noninverting input of operational amplifier 101. The emitter of the transistor is connected to ground. The output of current source 113 is also connected to a capacitor 115, with the voltage across the capacitor providing the signal labelled SSTART. The drain of an NMOS transistor 117 is connected to the junction of the current source 113 and the collector of transistor 111. The source of transistor 117 is connected to ground. The signal SSTART is connected to the noninverting input of linear mode amplifier 101.

The output of an inverter 121 is connected to the gate of an NMOS transistor 123. The source of an NMOS transistor 125 is connected to the drain of transistor 123. The source of transistor 123 is connected to ground. The junction of the drain and source of transistors 123 and 125 is connected to the noninverting input of operational amplifier 127. The inverting input is connected to voltage signal REG from the voltage divider comprising resistors 103 and 105. The output of operational amplifier 127 is connected to the gate of npn transistor 131. The emitter of transistor 131 is connected to ground and the collector is connected to the drain of transistor 117. The collector is also connected to the noninverting input of linear mode error amplifier 101. The output of linear mode amplifier 101 is connected to one of the two inputs of square root block 133, which is shown in more detail in FIG. 4. The output of amplifier 101 also provides the signal COMP to one end feedback compensating series connected resistor 132 and capacitor 134. The other end of the series connected resistor and capacitor is connected to controller signal REG. Also connected to one of the inputs of the square root block is a voltage signal labelled VINRMS which is proportional to the rectified average input voltage. A voltage divider comprising two resistors 135 and 137 connected in series between the terminal 23 and 25. A capacitor 141 is connected in parallel with resistor 137, which has one end connected to terminal 25. The output of the square root block 133 is connected to the inverting input of comparator 95 and through a resistor 143 external to the controller to common terminal 25 of the converter. The signal provided by the square root circuit is labeled ERROR.

The protection circuitry includes an inverter 145 which is connected to a digital signal ONOFF which is supplied externally to the controller. A high digital input turns the converter on, a low level turns the converter off. If no input is provided the level remains high. The output of inverter 145 is connected to one input of a two input OR gate 147. The output of OR gate 147 is connected to the gate of transistor 117 and to the reset terminal of a RS flip flop 151, which serves as the over voltage latch. A signal OVLATCH which is proportional to the output voltage of the converter and obtained from a voltage divider comprising resistors 153, 155, and 157 which are connected in series between the terminals 27 and 25. The signal OVLATCH is obtained between resistors 155 and 157 and is connected to the noninverting input of a comparator 161. A zener diode reference is connected to the inverting input of comparator 161. The output of comparator 161 is connected to the set terminal of RS flip flop 151. The Q output of flip flop 151 is connected to one input of three input OR gate 163 and to one input of three input NOR gate 165. The output of OR gate 147 is connected to the second input of three input NOR gate 165. A signal UVOUT which is proportional to the output voltage of the converter is obtained from the voltage divider comprising resistors 153, 155, and 157, from between resistors 153 and 155. The signal UVOUT is connected to the inverting input of hysteretic comparator 167. A voltage VREF is connected to the noninverting input of comparator 167. The output of comparator 167 provides the third input to NOR gate 165. The output of NOR gate 165 provides the signal PORBAR which is connected through a resistor 171 to isolated DC/DC converters 5 shown in FIG. 1. A signal NOLINE is developed across capacitor 175 from a current source 177. The signal is connected at one end to the common terminal 25 and is connected at the other end to the noninverting terminal on a comparator 181 in the controller. A reference voltage VREF is connected to the inverting input of comparator 181. The output of comparator 181 is connected to the second input of three input OR gate 163. The output of OR gate 163 is connected to the inverter 121 and to the gate of transistor 125. The signal LINE is connected to the noninverting input of a differential amplifier 183. A reference voltage VREF is connected to the inverting input. The output of differential amplifier is connected to the gate of an n-channel MOSFET 185. The drain of the MOSFET is connected to the noninverting input of comparator 181 and the source is connected to ground.

Figure 4:
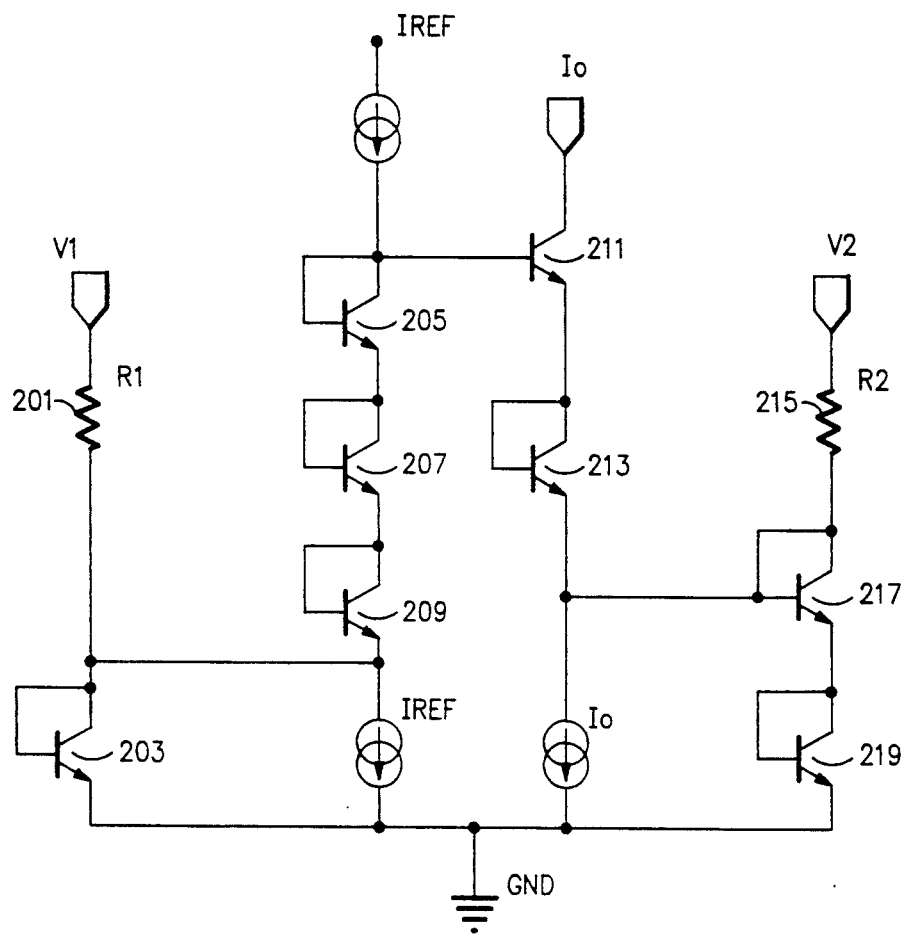
FIG. 4 is schematic diagram representation of the square root block of FIG. 3.

Referring now to FIG. 4, a simplified schematic circuit diagram of square root block 133 is shown. The square root block 133 provides a current proportional to the ratio of the square root of a first input voltage divided by a second input voltage. In the simplified schematic, a first voltage V1 is connected through a resistor 201 to the base and collector of an npn transistor 203. The emitter of 203 is connected to ground. A first current source Iref is connected to three npn transistors 205, 207, and 209 which are connected in series with one another. Each of the transistors 205, 207, and 209 has its base connected to its collector, with the collector of 205 connected to the first current source, and the emitter of transistor 205 connected to the collector of transistor 207. The emitter of transistor 207 is connected to the collector of transistor 209. The emitter of transistor 209 is connected to a second current source Iref which in turn is connected to ground. The collector of transistor 203 is connected to the emitter of transistor 209. Output current Io is connected to the collector of npn transistor 211. The collector of transistor 205 is connected to the base of transistor 211. The emitter of transistor 211 is connected to the collector of npn transistor 213. The base of transistor 213 is connected to its collector. The emitter of transistor 213 is connected to a current source Io which in turn is connected to ground. A voltage V2 is connected through a resistor 215 to the collector of an npn transistor 217. Transistor 217 is in series with an npn transistor 219. The base and collector of transistor 217 are connected to one another. The base and collector of transistor 219 are also connected to one another. The emitter of transistor 213 is connected the base of transistor 217 and the emitter of transistor 219 is connected to ground.

Operation of the simplified schematic, shown in FIG. 4, is as follows. The current in transistor 203 is approximately equal to V1 divided by resistor 201, with the voltage across transistor 203 proportional to ln (V1/R1) according to the Ebers-Moll equation. The current flowing into transistor 203 from transistor 209 is balanced by current flowing into the second current source Iref. Current Iref from the first current source flows through transistors 205, 207, and 209, so the voltage across the three devices is proportional to 3 ln(Iref). The voltage at the base of transistor 211 is therefore proportional to 3 ln(Iref)+ln(V1/R1). The current in transistors 207 and 209 is approximately equal to V2/R2, so the voltage across transistors 217 and 219 is proportional to 2 ln(V2/R2). Current flowing into transistor 217 from the emitter of transistor 213 is balanced by current flowing into the Io source. The voltage across the base o emitter junctions of transistors 211 and 213 is shown by equation 1 below.

$$2\ln(Io) = 3\ln((Iref) + \ln(V1/R1) - 2\ln(V2/R2)) \quad (1)$$

Solving for Io results in equation 2, with Io being the current flowing in transistor 211.

$$Io = Iref^{1.5} \times ((V1/R1)^{0.5}/(V2/R2)) \quad (2)$$

Figure 5:
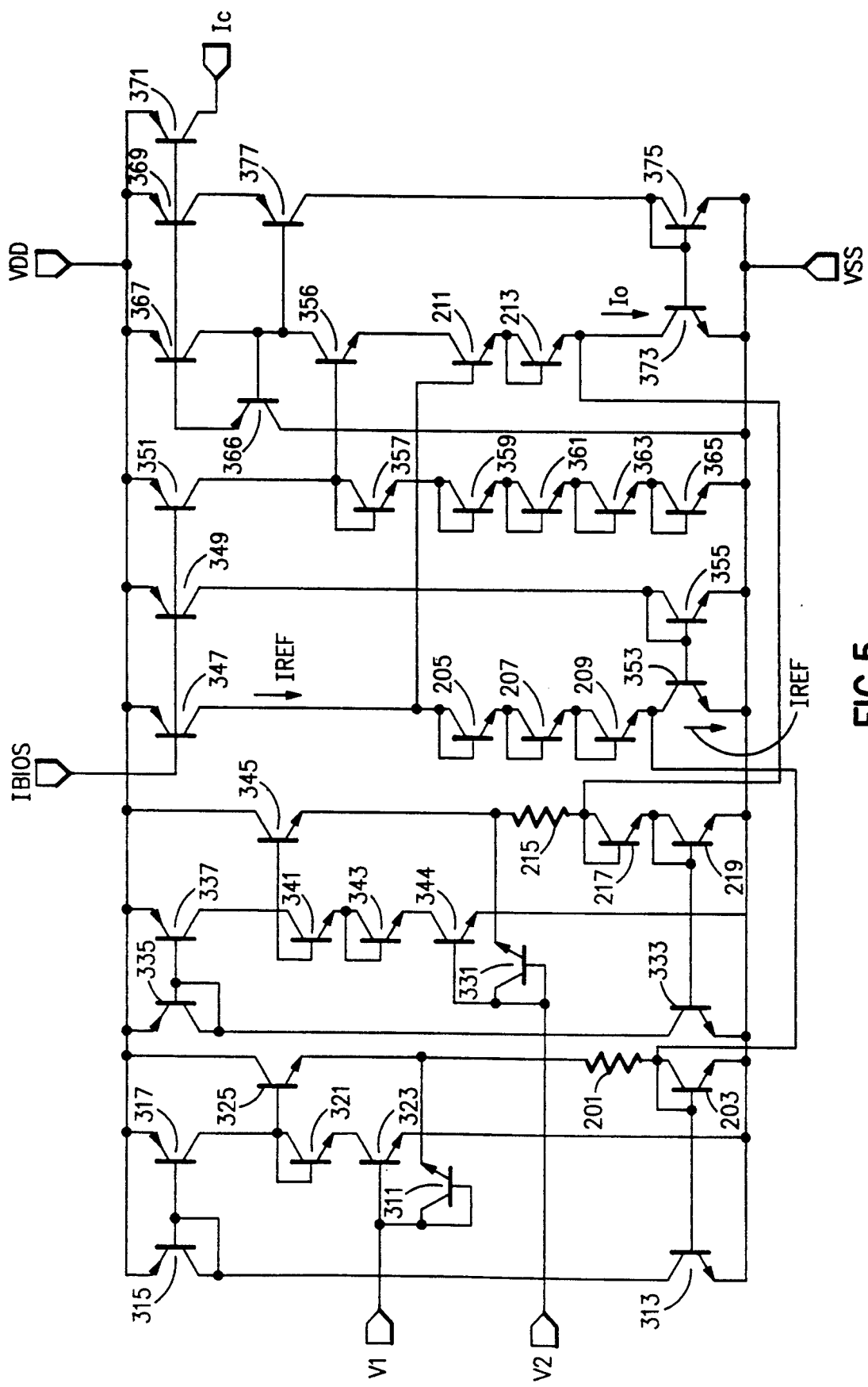
FIG. 5 is a more detailed schematic representation of the circuit in FIG. 4.

FIG. 5 shows a circuit implementation of the simplified schematic of FIG. 4, in which the voltage drops across transistors 203, 217, and 219 are compensated for and the input bias current is reduced. Early voltage effects (where the base-to-emitter voltage varies slightly with collector-to-emitter voltage at a given collector current) are eliminated, and current cancellation circuits are implemented. Voltage V1 is connected to resistor 201 through a diode connected npn transistor 311. Diode connected transistor 203 is in series with resistor 201 and the emitter of transistor 203 is connected to ground. The base of npn transistor 313 is connected to the base of transistor 203 and the emitter of transistor 313 is connected to the emitter of 203. Transistor 313 mirrors the current in transistor 203 and provides the mirrored current to a current mirror comprising pnp transistors 315 and 317. Transistor 315 and 317 have their emitters connected together and to a supply voltage. The base and collector of transistor 315 are connected to one another and to the collector of transistor 313. The current flowing through transistor 317 mirrors the current in transistor 315 and is provided to a diode connected npn transistor 321 which is in series with an pnp transistor 323 which has its collector connected to ground. The collectors of transistor 317 and 321 are connected together. The emitters of transistors 321 and 323 are connected together. The base of transistor 323 is connected to V1. An npn transistor 325 is in series with resistor 201, with the collector of transistor 325 connected to the emitter of transistor 317. The current through transistor 325 is controlled by the 2 Vbe drop across transistors 321 and 323 and provides a current in transistor 325 sufficient to make up for the voltage drop that occurs across transistor 203, so that V1 appears across 201 undiminished.

Similarly, the voltage drop that occurs across transistors 217 and 219 is compensated for by the current provided by npn transistor 345, which has its emitter connected to resistor 215 and its collector connected to the collector of transistor 325. Resistor 215 is in series with transistors 217 and 219. The base of transistor 345 is controlled by the voltage drop across series connected transistors 341, 343, 344 when the current through 217 and 219 is provided thereto by a current mirror comprising npn transistors 219 and 333, and a current mirror comprising pnp transistors 335 and 337. Current mirrors with pnp transistors source current while current mirrors with npn transistors sink current. Transistor 341 is an npn type while transistors 343 and 344 are pnp types. The base and collector of transistor 341 are connected to each other as is the base and collector of transistor 343. The collector of transistor 341 is connected to the collector of transistor 337 and to the base of transistor 345. The emitters of transistor 341 and 343 are connected to one another. The collector of transistor 344 is connected to the emitter of transistor 219. Voltage V2 is connected to the base of transistor 344. The bases and emitters of transistors 333 and 219 are connected to one another. The base and collector of transistor 335 are connected to one another and to the collector of transistor 333 and to the base of transistor 337.

A bias current provided to the base of pnp transistors 347, 349, and 351 which each have their emitters connected to one another and to supply voltage each provide a current Iref which is determined by the common bias current. Iref is supplied to series connected transistors 205, 207, and 209. A current mirror comprising npn transistors 353 and 355, has transistor 353 in series with transistor 209. Transistor 355 sets the current in the current mirror and the base of transistor 355 is connected to its collector, to the collector of transistor 349, and to the base of transistor 353. The emitter of transistors 353 and 355 are connected together and to a common voltage Vss. Therefore, transistor 353 carries Iref. To achieve a diode drop across transistors 211, 213, 217, and 219 to avoid the Early effect, transistor 356 which is in series with 211 and 213 provides sufficient current for the five Vbe drops across transistors 211, 213, 217, 219, and 331. The base voltage of transistor 357 is controlled by the voltage drop across series connected npn transistors 357, 359, 361, 363, and 365, each of which has its collector connected to its base and carries the current Iref since the transistors are in series with transistor 351. The output current is supplied by a current mirror which supplies current to two loads comprising pnp transistors 366, 367, 369, 371, with the current in transistor 367 controlling the current in transistors 369 and 371. A current mirror comprising npn transistors 373 and 375, with the current in transistor 375 controlling the current flowing in transistor 373, provides the current Io in series between 213 and ground. Transistor 377 eliminates the Early voltage effect in transistor 369. Transistor 371 of the current mirror provides the output Io of the circuit which represents a current proportional to the ratio of the square root of a first voltage V1 divided a second voltage V2.

The operation of controller 9 when connected to a boost converter will now be described. When power switch 15 is turned on by controller 9, current in inductor 13 rises linearly from zero until the power switch is turned off. Diode 17 is reverse biased when the power switch is conducting, with the load current provided by capacitor 21. When the power switch is turned off, the voltage across the switch rises rapidly until diode 17 conducts, clamping the voltage across the switch to the output voltage level plus a diode drop. After all the energy in inductor 13 is expended, the voltage across the power switch begins to drop, as the inductor rings with parasitic capacitances around the input voltage. The controller senses when the voltage has rung below the the input voltage and, after a delay to allow the voltage to reach its minimum value, switches on the power switch to initiate another operating cycle.

By allowing current in the inductor to drop to zero before turning the power switch on, switching losses associated with the diode's reverse recovery time are eliminated. Turning on the power switch when the voltage across it is at the minimum value of its ring excursion greatly reduces turn on switching losses. Turn off switching loss is reduced by turning the power switch off very rapidly, with the help of transistor 52, so that the power switch is off before parasitic capacitances have allowed voltage across it to rise significantly. Near unity power factor is obtained by maintaining the power switch on-time nearly constant over each AC line cycle, while adjusting the on-time at a slow rate to achieve output voltage regulation. The very slowly varying on time causes the current which is drawn from the power source to be proportional to the voltage across the inductor 13, which follows the rectified voltage waveform provided by the full wave rectifier bridge 3. When the current drawn by the boost converter is smoothed by the EMI filter 1 it results in a current waveform which sinsusoidal and in phase with the source sinusoidal voltage. A small correction to switch on-time is made each converter switching cycle to compensate for negative current flowing in inductor at the time the power switch is turned on. This correction is directly proportional to input line voltage.

Resistors 135 and 137, and capacitor 141 feed a voltage to controller 9 that is proportional to the average input line voltage. Resistors 35 and 37 feed a voltage to the controller that is proportional to the instantaneous line voltage. This is used to check for line outages, set current sources used to reduce current distortion and check for excessive volt time across inductor 13, preventing saturation. Capacitors 71 and 91 are used to set switch on-time. When power switch 15 is on, capacitor 71 is charged by a current proportional to the line voltage. When the voltage on capacitor 91 exceeds 1 volt, capacitor 91 is charged by a current from current source 87 inversely proportional to the error voltage. When voltage on capacitor 91 exceeds the error voltage, power switch 15 is turned off. While power switch 15 is still on, capacitor 81 is charged by a current from current source 77 proportional to the line voltage. If the voltage on capacitor 81 exceeds 5 volts, the power switch is turned off to prevent inductor 13 from saturating due to excessive volt time product. Capacitor 61 is charged by a constant current from current source 57 during the time the power switch is off. If the voltage on capacitor 61 exceeds 5 volts, the power switch is turned on. This prevents the converter from getting hung up in the off state due to situations where the normal turn-on circuit does not function. When the voltage on LINE is below 2.15 volts, capacitor 175 is charged by a constant current from current source 177. If the voltage on capacitor 175 exceeds 5 volts, it is assumed that the input line voltage is not available and the converter does not switch the power switch 15. A circuit connected to SSTART is activated that causes the voltage on SSTART to track the voltage on REG, which is proportional to the output voltage of the converter, until the line voltage returns. When it returns, the converter restarts and the output ramps up to its nominal output voltage.

During start-up, capacitor 115 is charged by a constant current from zero to the nominal reference voltage by a constant current source 113. The controller adjusts the power switch on-time so that the voltage on REG is equal to the voltage on SSTART to achieve a soft start turn-on. If the controller is in shutdown mode, the voltage on SSTART is regulated to equal the voltage on REG. Resistors 153, 155, and 157 feed a voltage to the controller that is proportional to the output voltage. If the voltage on UVOUT is below 5 volts, PORBAR is held low. Resistors 103 and 105 feed a voltage to the controller that is proportional to the output voltage. REG is the input to the controller's error amplifier 101. The output of error amplifier 101 appears on COMP, with resistor 132 and capacitor 134 providing feedback compensation. The square root of COMP voltage is divided by the voltage on INRMS to provide an error current on ERROR which is converted to a voltage by resistor 143. Resistors 41 and 43 and their respective parallel capacitors 42 and 44, provide a voltage to the controller that is proportional to the voltage across the power switch. When the voltage on DRAIN falls below the voltage on LINE, the power switch is turned on.

Figure 6:
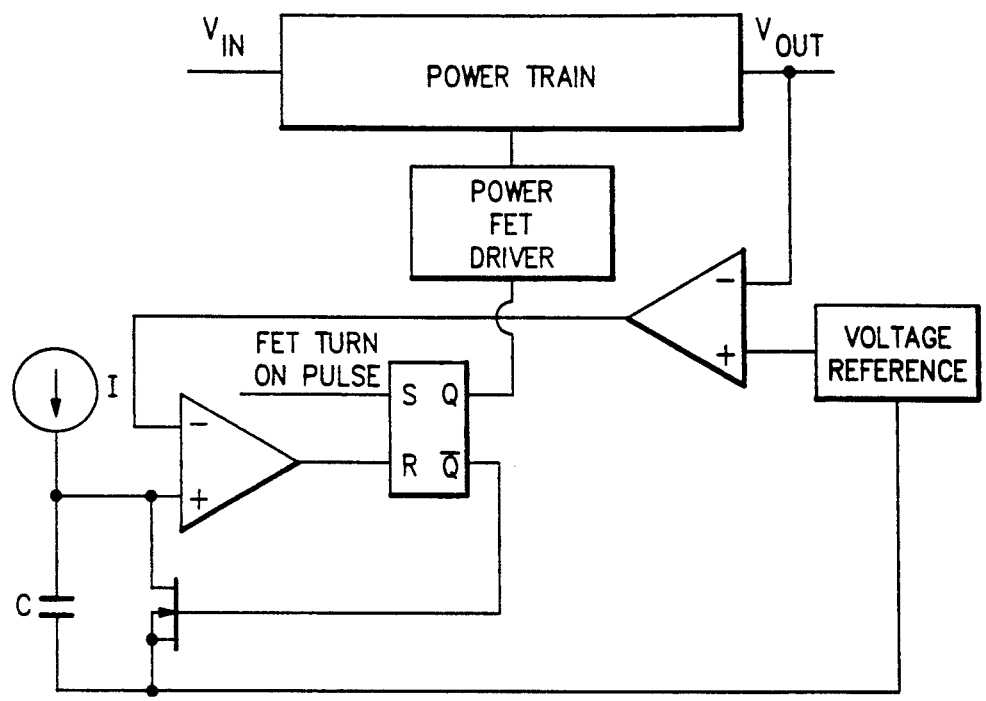
FIG. 6 is a part schematic part block diagram representation of prior art timing circuitry to regulate the on and off times of the power switch used to control the power flow within the power supply.
Figure 7:
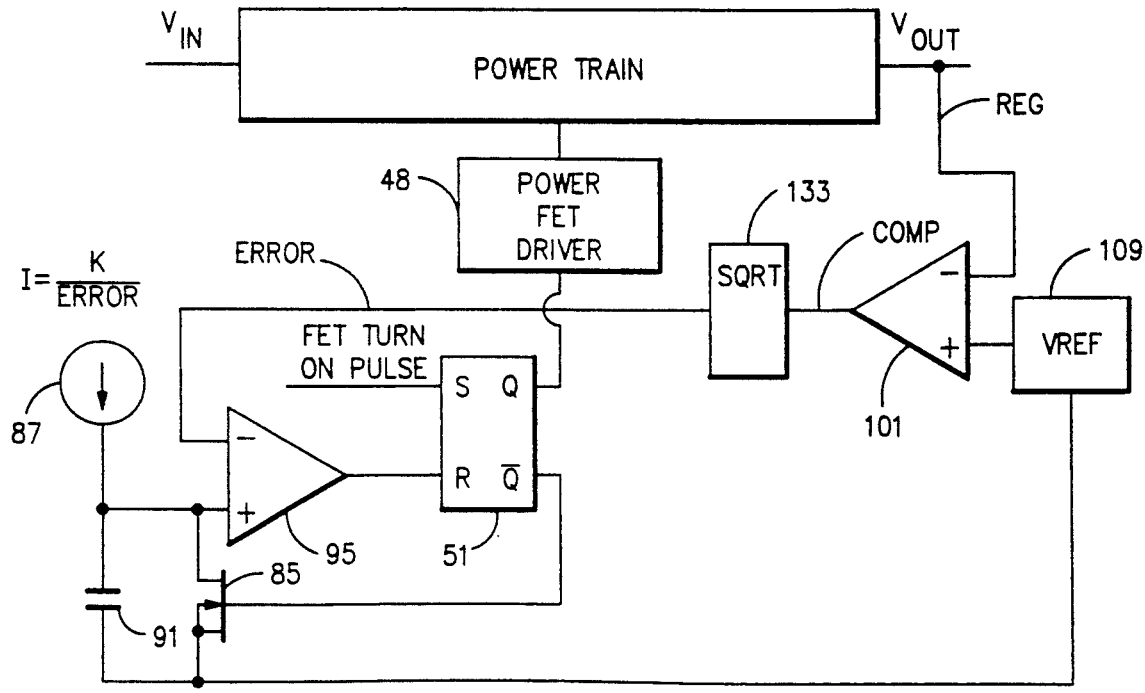
FIG. 7 is a part schematic part block diagram representation of the timing circuitry in accordance with the present invention.

Switching power supplies usually employ timing circuitry to regulate the on and off times of the switches used to control the power flow within the supply. As shown in FIG. 6 labelled prior art, circuits often consist of a constant current source I charging a capacitor C to a predetermined level to set the switch on or off time. When the switch is turned on, a current source charges capacitor C. When the voltage on the capacitor exceeds an error voltage, Verror, a comparator output transitions terminating the power device on time and causing the voltage across the capacitor to be reduced to a low level. With previously employed timing circuitry the device on time is given by $$TON = (C \times Verror)/I. \quad (3)$$

If the input voltage is increased or the load decreased, it is often necessary to reduce the power device on time T to maintain regulation. As the on time is reduced, however, the timing circuitry becomes increasingly sensitive to noise. Since Verror is so low, a small amount of noise will cause large proportional change in on time, with relationship expressed as $$dT/T = (C/(I)(T)) \, dVerror \qquad (4)$$

Figure 8:
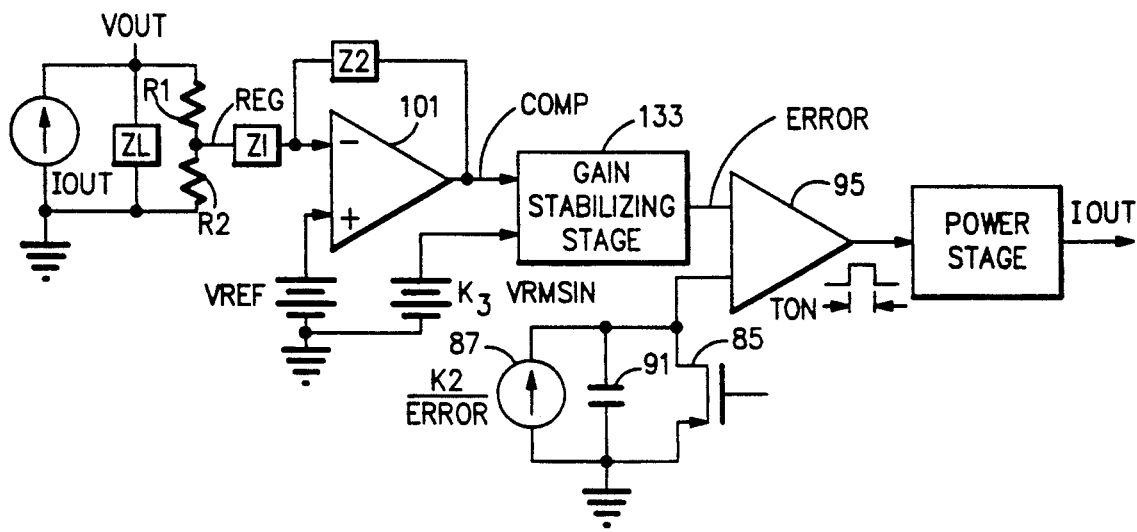
FIG. 8 is a part schematic part block diagram representation of a voltage regulating control loop for the boost converter of FIGS. 2 and 3.
Figure 9:
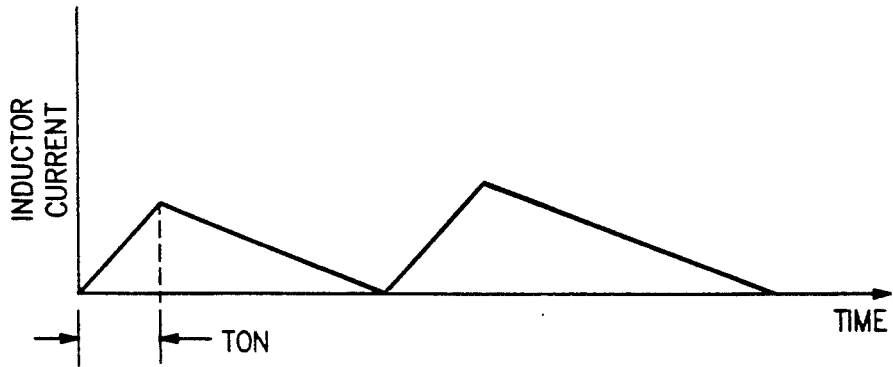
FIG. 9 is a waveform diagram of the inductor current and power switch on time.

Referring now to FIG. 8, a voltage regulating control loop for the boost converter of FIGS. 2 and 3 is shown. Elements corresponding to elements shown in FIGS. 2 and 3 have the same reference numerals. The control for the boost converter are designed so that FET 15 on time is effectively constant over one line (50/60 Hz)half-cycle and the power FET 15 is turned on almost immediately after the current in the inductor has decayed to zero from the previous switching cycle. This is illustrated in FIG. 9. A current source Iout provides an average current equal to the average output current of the boost converter operating on the continuous/discontinuous boundary.

$$Iout = (VINRMS)^2(TON)/(2)(L)(Vout) \qquad (5)$$

where TON is the power stage FET 15 on time, L is the power stage inductance 13, Vout is the average output voltage over one 50/60 Hz half-cycle, VINRMS is the rms value of the 50/60 Hz half-cycle. The power stage and controls provide Vout as an essentially DC voltage.

The average output voltage is developed across an impedance Z1 representing the load impedance, connected across the current source Iout. The voltage is reduced by voltage divider comprising resistors 103 and 105 and supplied to operational amplifier 101 with resistor 132 and capacitor 134 providing feedback compensation. A voltage reference Vref1 is provided to the noninverting input of the operational amplifier 101 and corresponds to signal line 102 in FIG. 3. The output of the operational amplifier provides a voltage signal Vcomp, which is a function of the DC output current of the boost converter, to one input of square root block 133 which serves as a gain stabilizing stage. A signal proportional to the input voltage to the boost converter provides the other input to the gain stabilizing stage. The output of the gain stabilizing stage is a voltage signal ERROR together with the voltage across capacitor 91 in comparator 95 determines the duration of FET 15 on time.

Capacitor 91 is charged by a current inversely proportional to the voltage signal ERROR from current source 87 with the on time given by $$TON = (TON/k2)(ERROR)^2 \qquad (6)$$

The square root block provides $$ERROR = k4 \, (COMP)^{\frac{1}{2}}/k3 \, VINRMS \qquad (7)$$

where k3 and k4 are constants.

The use of a charging current inversely proportional to the ERROR instead of a constant current reduces noise sensitivity. Since on time is proportional to the square of ERROR, a change in error voltage causes a proportionally larger change in on time compared to using a constant current source to charge the capacitor. This causes the circuit to be much less sensitive to noise, since the error voltage is higher for a comparable on time, a noise signal of a given amplitude causes a smaller proportional change in the on time. This can be expressed as $$dT/T = 2(C/k2)^{\frac{1}{2}} \, dERROR \qquad (8)$$

Since sensitivity is a function of 1 over the square root of T rather than 1 over T which would occur if the charging current was constant sensitivity is reduced. For example, in a system with a maximum voltage on the capacitor of 4 volts running at 5% of the maximum on time, a 100 mvolt noise pulse would change the on time by only 11% compared to a circuit which used a constant current source which would have a change in on time of 50%. This results in much less jitter in the circuit of the present invention. The open loop AC gain of the output voltage control loop Aol is $$Aol = Z1(kj)(kk)(C_T(k4)^{2/k2(k3)2}(1/(2L(Vout))) \qquad (9)$$

where $C_T$ corresponds to capacitor 91, kj = R2/(R1+R2), and kk = Z2/(Z1+((R1)(R2)/(R1+R2))) and the AC gain is independent of the DC output current and VINRMS because of the use of the gain stabilizing stage.

Vout is held effectively constant by the control loop. Z1 can be easily be designed to be known in the region of the open-loop unity gain crossover. Thus, the loop gain for all practical purposes is fixed by the values of the loop compensation components, all of which are fixed by the regulator designer. Without the gain stabilizing stage the open loop AC gain would vary with Vrms and with COMP which is a function of the DC output current. These loop gain variations make it impossible to fix the open loop unity gain bandwidth, which causes severe performance limitations when the loop compensation is set so that the regulator is stable for all COMP an VINRMS variations and has an acceptable maximum unity gain open loop gain over these variations.

Figure 10:
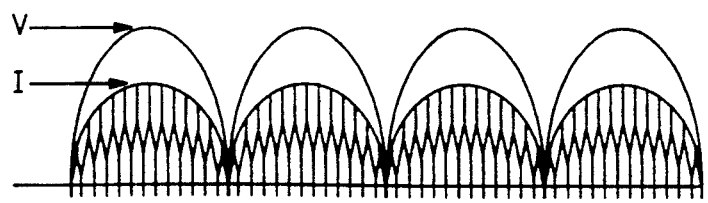
FIG. 10 shows the rectified line voltage waveform Vin(t) which is provided to the boost converter and the inductor current, whose average value follows the input voltage waveform to achieve high power factor and low input current harmonic distortion.

The power FET is driven by a pulse generator whose on time is essentially constant over a single line cycle. Off time is terminated when current in the inductor falls to zero and Vc falls below Vin(t). An additional delay causes turn on to occur at the minimum of the voltage ring to minimize turn on switching losses. The waveform in FIG. 10 shows the rectified line voltage waveform present on Vin(t) and the inductor current, whose average value follows the input voltage waveform to achieve high power factor and low input current harmonic distortion.

Figure 11A:
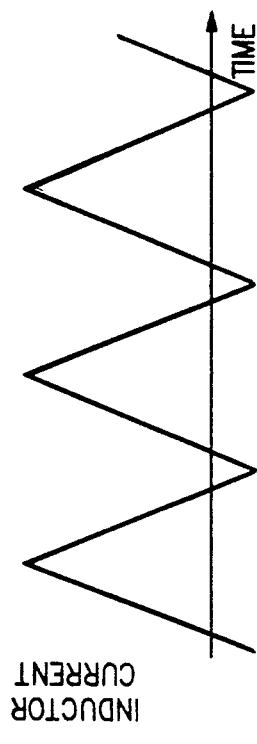
FIGS. 11A and 11B show inductor current and FET voltage, respectively, on a common time scale for high input voltage conditions
Figure 11B:
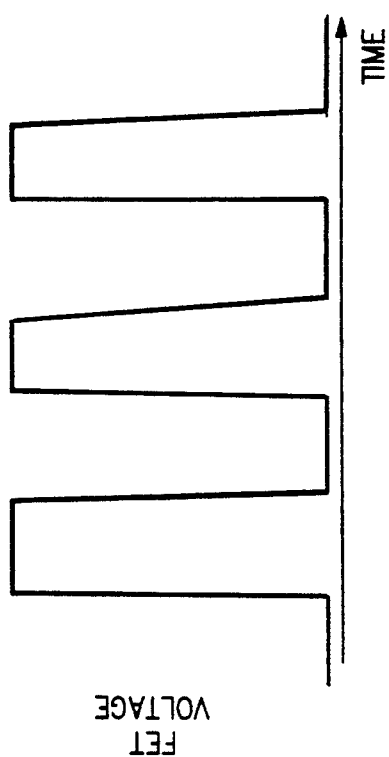
Figure 11C:
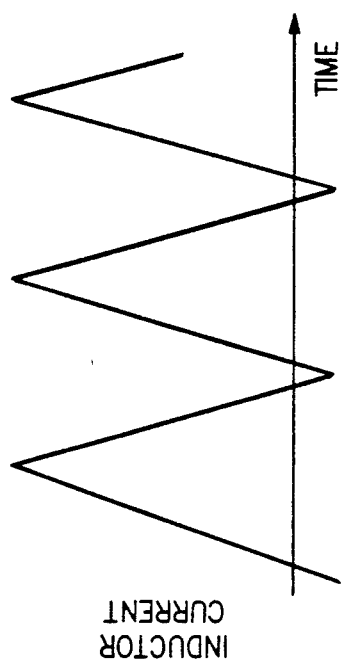
FIGS. 11C and 11D show inductor current and FET voltage, respectively, on a common time scale for low input voltage conditions.
Figure 11D:
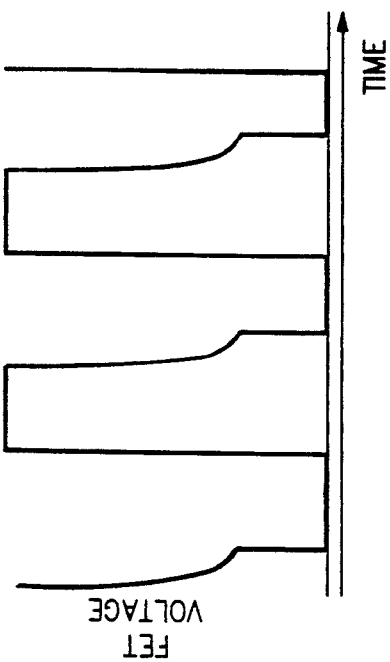
Figure 12:
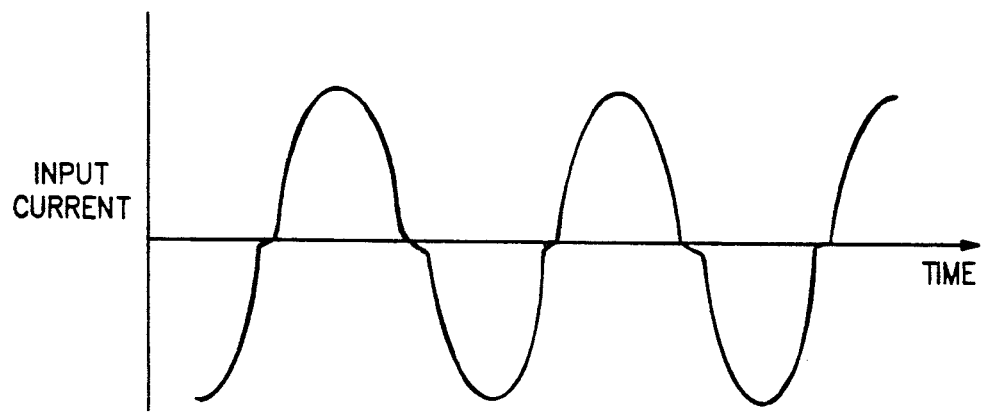
FIG. 12 shows current distortion in the input current drawn from an AC power source due to LC resonance in the circuit.

When current in the inductor falls to zero, voltage on Vc rings down at a resonant frequency given by $$F(res) = 2 \, pi \, (LC)^{\frac{1}{2}} \qquad (10)$$

where L is the inductance of the boost inductor and C is the parasitic FET and diode capacitance on node Vc, as well as any added external capacitance. The peak to peak voltage amplitude of the ring is 2 (Vout-Vin(t)). If Vin(t) is more than half Vout, the control circuit turns the power FET on when the voltage on Vc is at its minimum value and the current in L is zero. If Vin(t) is less than half Vout, Vc is clamped at zero by the internal FET diode prior to the turn on of the power FET. In this case turn on occurs with negative current flowing through the FET and inductor. Part of the FET on time is therefore used to charge the inductor current back to zero before energy can begin to flow back into the converter. FIGS. 11A and 11B show inductor current and capacitor voltage on node Vc, respectively, for high input voltage conditions and FIGS. 11C and 11D show inductor current and capacitor voltage on node Vc, respectively, for low input voltage conditions. At very low input voltage, no net current flows in the converter, since the entire on time is required to return the inductor current to zero, then charge C back up to Vout. The result of this is a narrowing of the input current conduction angle with an on time dependent dead time around the zero voltage crossover of the input voltage as shown in FIG. 12.

The following equations show the value of the voltage at node Vc and inductor current, respectively, during the ringing, assuming current in L drops to zero at t=0.

$$Vc(t) = (Vout - Vin(t)) \cos (1/(LC)^{\frac{1}{2}})t + Vin(t) \quad (11)$$

$$Il(t) = -(C/L)^{\frac{1}{2}}(Vout - Vin(t)) \sin (1/(LC)^{\frac{1}{2}})t \text{ for } Vc(t) > 0 \quad (12)$$

Equation 13 gives the time at which the voltage at node Vc falls to zero in the condition when $Vin(t) < \frac{1}{2}$ Vout.

$$t_{vc=0} = (LC)^{\frac{1}{2}} \cos^{-1} (Vin(t)/(Vin(t) - Vout)) \quad (13)$$

Equations 14 and 15 give different expressions for the inductor current when the voltage at node Vc reaches zero.

$$Il_{vc=0} = -(C/L)^{\frac{1}{2}}(Vout - Vin(t)) \sin (\cos^{-1}(Vin(t)/(Vin(t) - Vout))) \quad (14)$$

$$Il_{vc=0} = (C/L)^{\frac{1}{2}}(Vout^2 - 2 Vin(t) Vout)^{\frac{1}{2}} \quad (15)$$

Figure 13:
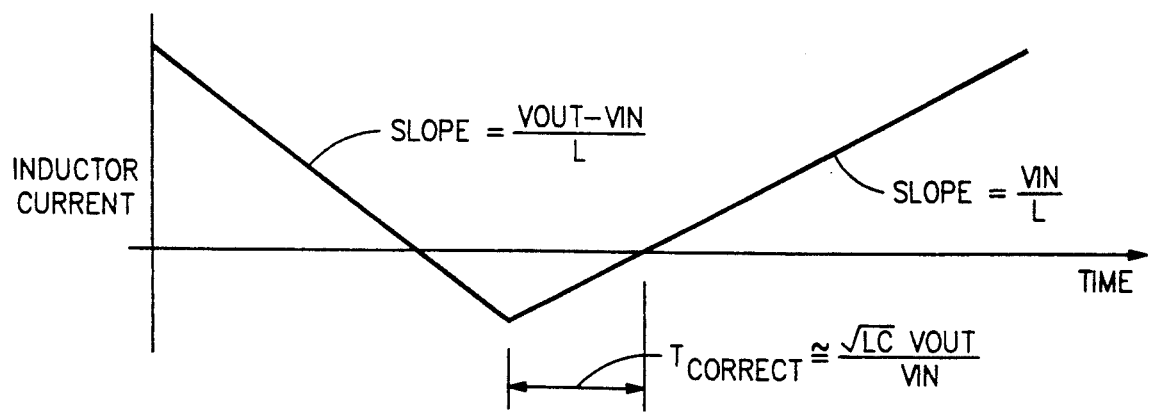
FIG. 13 shows the effects of LC resonance on the inductor current causing negative current to flow when the input voltage is low.

The crossover distortion can be reduced by adding a period of time to the FET on time to allow the inductor current to rise to zero before the normal "constant" on time period begins. An exact expression for the amount of the time required for the current to reach zero is shown in equation 16. The inductor current versus time is shown in FIG. 13.

$$t_{correct} = ((LC)^{\frac{1}{2}}/Vin(t) (Vout^2 - 2 Vin(t) Vout)^{\frac{1}{2}} \quad (16)$$

The expression in equation 16 will be negligibly small when Vin(t) is large, and can be approximated by equation 17. Likewise, the small time constant associated with this term at high line voltage will usually produce negligible error when $Vin(t) > \frac{1}{2}$ Vout, even though no correction is called for under this condition.

$$t_{correct} = ((LC)^{\frac{1}{2}}Vout)/Vin(t) \text{ For } Vin(t) \text{ small} \quad (17)$$

The delay is introduced by current source 67 which has a current proportional to the average input voltage charging capacitor 71. Capacitor 71 is selected so that it is proportional to $((LC)^2 Vo)$. Comparator 73 determines when the appropriate delay occurs allowing current source 87 to charge capacitor 91.

Figure 14:
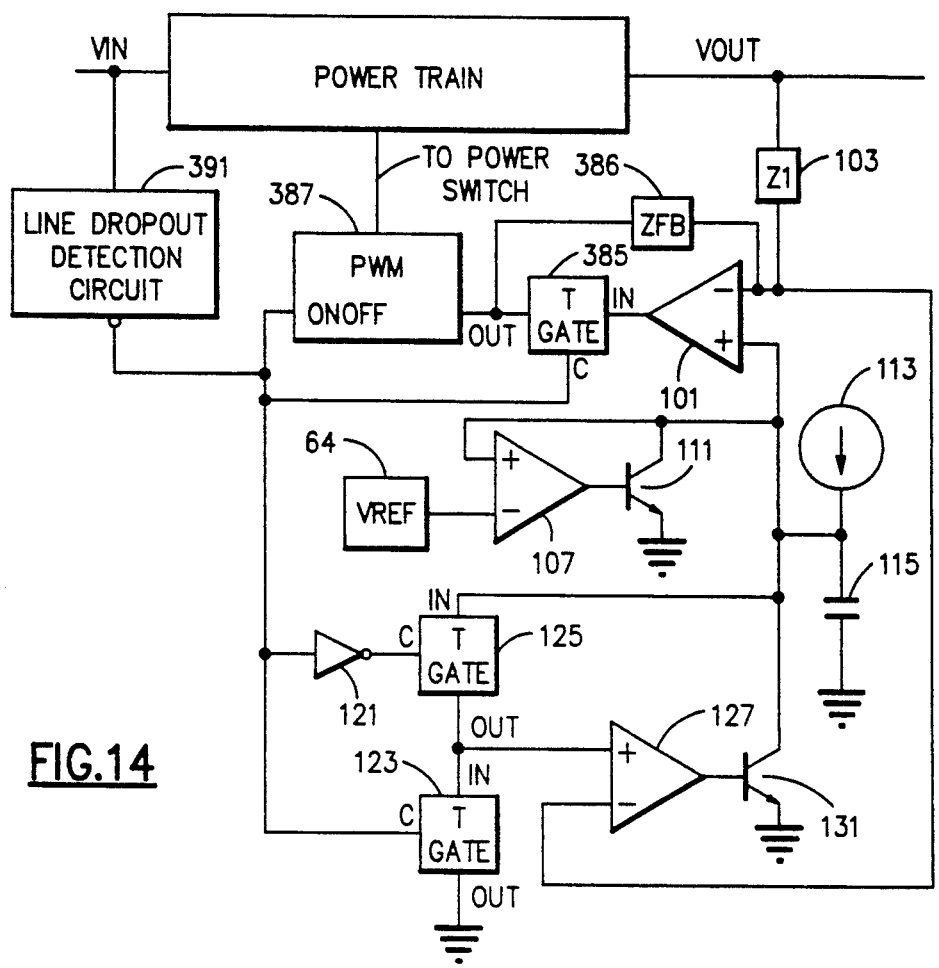
FIG. 14 is a part block diagram part schematic representation of a PWM switchmode regulator with line dropout recovery circuit in accordance with the present invention.
Figure 15:
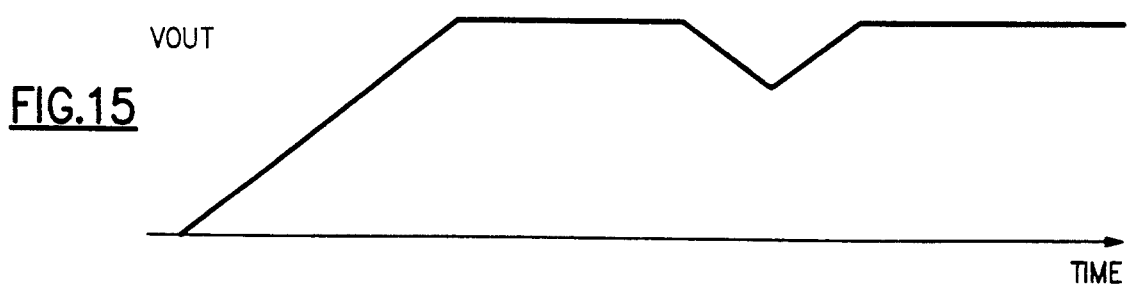
FIG. 15 is a waveform diagram of the output voltage of the PWM switchmode regulator of FIG. 14 during start up and line dropout recovery.
Figure 16:
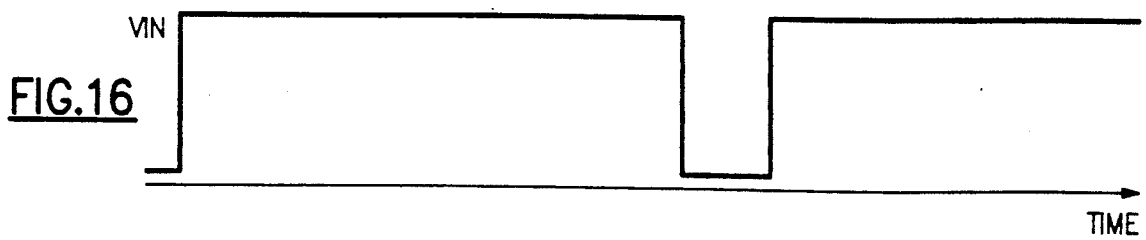
FIG. 16 is a waveform diagram of the rectified input voltage of the PWM switchmode regulator of FIG. 14 during start up and line dropout recovery.

Referring now to FIG. 14, a dropout recovery circuit is shown. Power supplies operated from power lines must be able to deal with occasional power line disturbances, such as momentary dropouts or under voltages. An error amplifier 101 receives at its inverting input a voltage proportional to Vout through an impedance 103. The noninverting input to the error amplifier is the voltage across capacitor 115 to ground, which is charged by a current source 113. The output of the error amplifier is supplied through a T gate 385 to a PWM control 387 with the signal provided to the control attempting to regulate Vout proportional to the voltage on capacitor 115. A feedback impedance 386, which can comprise a resistor 132 series with a capacitor, is connected between the inverting input of the error amplifier 101 and the output terminal of T gate 385. T gates are analog devices have three terminals labelled C, IN, and OUT, which stand for Control, Input, Output, respectively. When the signal on the C terminal is high, the O and I terminal are connected together and when C is low, there is a high impedance between terminals O and I. During normal start up, capacitor 115 is linearly charged by the current source 113 until the voltage across capacitor 115 is equal to VREF. At this point operational amplifier 107 which has reference voltage VREF at its inverting input and the voltage across capacitor 115 at its noninverting terminal, controls the base of npn transistor 111 to maintain capacitor 115 at VREF. During normal operation T gate 385 connects the output of error amplifier 101 to PWM control 387 and the noninverting input of operational amplifier 127 to ground, so that npn transistor 131 is nonconducting. If a line dropout is detected in block 391, a low signal is sent to PWM control 387 turning the controller off. T gate 385 disconnects the output of error amplifier 101 so that feedback through the feedback impedance 386 does not affect the voltage at the inverting input of the error amplifier 101. T gate 123 disconnects the noninverting amplifier input from ground. Inverter 121 causes T gate 125 to connect the noninverting input of operational amplifier to capacitor 115. Transistor 131 is regulated by the output of amplifier 127 to have the capacitor voltage follow the output voltage of the converter down during the output voltage when the input line is not present. If the line voltage returns line dropout detection circuit 391 provides a high signal causing the state of the T gates to reverse. The PWM control is turned back on, Vout ramps up to its normal level as though completing a normal soft start. The rate of recovery can be changed by adjusting the value of C to optimize performance for both soft start and fault recovery. FIG. 15 and FIG. 16 show the output voltage of the converter and the rectified input voltage, respectively, for both start up and line dropout recovery.

Referring now to FIG. 2 and FIG. 3, the ASIC is divided into five sections: power switch turn on control; power switch turn off control; output voltage regulator; control logic and driver; and monitor and protection circuitry. The turn on circuitry functions as follows. When the voltage on DRAIN falls below the voltage on LINE, the output of comparator 45 goes high. This transition activates the SET input of flip flop 51 causing the Q output of flip flop 51 to transition high, which causes DRIVE to go high. When DRIVE goes high, the power switch 15 is turned on. The DRIVE line can alternatively be transitioned high by the voltage of MAXOFF exceeding a reference voltage VREF as determined in comparator 63. When DRIVE is high indicating that the power switch is on, or the output of OR gate 53 is high indicating the converter is shut down or the power switch is being shut off, OR gate 53 turns on transistor 55 which holds MAXOFF low. When the output of OR gate is low and therefor the switch is off, constant current source 57 causes the voltage on MAX-OFF to increase by charging capacitor 61, and if MAX-OFF exceeds VREF switch 15 is turned on.

Turn off can occur due to either of two conditions. During the time the power switch is off, the Qbar output of flip flop 51 causes transistor 65 and 75 to hold VTIME and CROSS low. Since the voltage on CROSS is below 1 volt, differential amplifier 73 causes transistor 85 to hold TON low, also. When the power switch is turned on, transistors 65 and 75 are turned off, so VTIME is charged by current source 77, and CROSS is charged by current source 67. Currents in both current sources are directly proportional to the voltage on LINE, so higher rectified input voltages causes capacitors 71 and 81 tied to VTIME and CROSS to charge at a faster rate. When the voltage on CROSS exceeds 1 volt, differential amplifier 73 turns off transistor 85, allowing voltage on external capacitor 91 tied to TON to rise. Capacitor 91 is charged by a current inversely proportional to the error voltage developed by linear mode amplifier 101. When voltage on TON exceeds ERROR voltage, comparator 95 causes an input to OR gate 97 to go high, triggering the reset input of flip flop 51, turning off the power switch 15. As the ERROR voltage increases, the current charging TON decreases, and the comparator threshold voltage increases, so a very large range of power switch on time can be produced. Alternatively, if the voltage on VTIME exceeds REF, comparator 83 causes an input to OR gate 97 to go high, again resetting flip flop 51 and turning off the power switch.

During light load conditions, diodes 84 and 86 allow the voltage of the signal ERROR to go below the voltage of signal TON causing long off times between groups of several on off cycles. This condition is called burst operation. This not a separate control scheme that is called upon the detection of certain events, but rather is part of the single control scheme that is used.

The voltage regulator portion includes soft start, gain compensation, and error amplifier circuitry. If ONOFF is low, or if the Vcc voltage monitor signals that the Vcc voltage is low, OR gate 147 causes OR gate 163 to hold SSTART low. When transistor 117 is turned off, current source 113 charges an external capacitor 115 tied to SSTART with a constant current until the voltage on SSTART equals REF. At this point, operational amplifier 107 and transistor 111 control SSTART to equal Vref, assuming the controller is not shut down. If the controller shuts down, transistor 125 is turned on and transistor 123 is turned off, so operational amplifier 127 and transistor 131 regulate SSTART to equal REG. When the controller is not shut down transistor 125 is off and transistor 123 is on with operational amplifier 127 having a zero voltage input provided to its noninverting input and therefor does not regulate the SSTART voltage. Amplifier 101 is the controller's error amplifier and it adjusts the voltage signal COMP so that the voltage REG equals the voltage on SSTART. Amplifier 101 is also the system error amplifier, with the output frequency compensated by resistor 132 and capacitor 134 and connected to REG. The square root circuit modifies COMP, the output of amplifier 101 to compensate for variations in gain due to load and input voltage. The square root of the COMP voltage is divided by the average value of the input voltage VINRMS to produce a current for generating the ERROR voltage signal.

OR gate 97 combines turnoff signals due to shutdown, excess volt time, and normal; on time termination to produce a reset signal to flip flop 51. Flip flop 51 is set by OR gate 47.

The monitor and protection circuitry produces two outputs: a shut down line that holds the converter off, and a PORBAR line that powers an external device to short out the inrush limiting resistor. The PORBAR line can also be used to turn on and off cascaded converter stages. A low logical level on ONOFF or a high output from the Vcc monitor produces a high output from gate 147, holding the shutdown line high, the PORBAR line low, and resetting over voltage latch 151. A high output from over voltage comparator 167, indicating the OVLATCH exceeds REF, latches 151, sending the shutdown line high, and the PORBAR signal low. If the the voltage on UVOUT exceeds REF, the output of comparator 167 goes low, allowing PORBAR signal to go high. Voltage on UVOUT must fall below $\frac{1}{2}$ REF signal before the PORBAR signal is switched low. If the LINE signal is above 2.15 volts, comparator 183 causes MOSFET 185 to hold NOLINE low. When the LINE signal goes low, an external capacitor tied to the NOLINE signal is charged by constant current source 177. If the voltage on the NOLINE signal exceeds the REF signal, the output of comparator 181 goes high, causing the converter to shut down. Gate 163 combines signals from the no line, over voltage latch 151, the Vcc voltage monitor and ONOFF circuits to produce the shut down signal. Gate 165 combines signals from the low output voltage detector, over voltage latch, the ONOFF signal, and the Vcc voltage monitor to produce the PORBAR output.

The foregoing has described a control circuit that allows smooth recovery from momentary power line drop outs in a switchmode converter.

While the invention has been particularly shown and described with reference to a preferred embodiment thereof, it will be understood by those skilled in the art that various changes in form and details may be made therein with out departing from the spirit and scope of the invention.

Having thus described our invention, what we claim as new and desire to secure by Letters Patent is:

1. A soft start circuit for, controlling the switching of a switchmode 1 regulator to achieve a desired output, comprising:
   means coupled to the output of the switchmode regulator for providing a signal proportional to output of the switchmode regulator to be controlled;
   means for providing a reference signal proportional to the desired output value;
   a ramp circuit connected to the means for providing a reference signal for generating a signal which ramps to the reference signal during start and restart of the switchmode regulator;
   means connected to said means for providing a signal proportional to the output of said switchmode regulator for starting said ramp circuit at a value proportional to the output of the switch mode regulator to be controlled; and
   means for comparing the ramp circuit signal to the signal proportional to the output of the switchmode regulator to generate an error signal, said error signal controlling operation of said switchmode regulator.

2. The soft start circuit of claim 1 wherein said ramp circuit comprises means for generating a first signal, means for integrating said first signal to provide a second signal, and means for clamping said second signal to the reference signal value, said second signal providing the ramp circuit signal.

3. The soft start circuit of claim 1 wherein said ramp circuit comprises a current source, a capacitor connected to said current source, and a clamp limiting the voltage on said capacitor to the reference signal value, said capacitor voltage providing the ramp circuit signal.

4. A circuit for restarting a switchmode regulator comprising:

means for providing a first signal proportional to the desired output of said switchmode regulator;
  means for modifying the first signal value during restart including means for generating a second signal, means for integrating said second signal to provide a third signal, and means for clamping said third signal to a predetermined value;
  means coupled to the output of said switchmode regulator for generating a fourth signal proportional to the output of the switchmode regulator to be regulated;
  means for providing a fifth signal proportional to the difference between said third signal and said fourth signal;
  means coupled to the input of said switchmode regulator for detecting the decrease of input voltage to said switchmode regulator below a predetermined value for stopping switchmode regulator operation including the generation of said second signal; and
  means connected to said means for integrating for having the fourth signal follow the fifth signal when said means for detecting stops the switchmode regulator operation, so that on restart the fifth signal provides the initial value of said third signal.

5. The circuit for restarting a switchmode converter of claim 4, wherein said means for generating a second signal comprises a current source, said means for integrating said second signal comprises a capacitor connected to said current source, and said capacitor voltage providing the third signal.

6. A switchmode regulator having a switch controlling the transfer of power from the input to the output, said regulator comprising:

means coupled to the output of said switchmode regulator for generating a signal proportional to the output provided by said regulator;
  means for generating a reference signal, said means including means for controlling the rate at which said signal increases to a predetermined maximum value;
  means for comparing the signal proportional to the output of the regulator to said reference signal for generating an error signal;
  control means for controlling the switching of said switchmode regulator to control the output voltage of said regulator responsive to said error signal;
  means for detecting a drop in the input voltage supplied to said switchmode regulator below a predetermined value;
  means responsive to said means for detecting a drop in the input voltage supplied to the regulator for discontinuing the switching of said switchmode regulator when said input voltage is below a predetermined value; and
  means responsive to said means for detecting a drop in the input voltage for causing the reference voltage to track the signal proportional to the output of said regulator while said input voltage is below a predetermined value, so that when said input voltage is no longer below a predetermined value, the reference voltage increases at a predetermined rate to a predetermined maximum value and the regulator resumes switching.

7. The switchmode regulator of claim 6 wherein said means for generating a reference signal comprises a current source, a capacitor connected to said current source, and a clamp limiting the voltage on said capacitor to a predetermined value.

8. The switchmode regulator of claim 6 wherein said control means is a pulse width modulation control.

* * * * *